US012489206B2

(12) United States Patent
Yun

(10) Patent No.: US 12,489,206 B2
(45) Date of Patent: Dec. 2, 2025

(54) MULTI-BEAM ANTENNA USING HIGHER-ORDER MODES

(71) Applicant: Electronics and Telecommunications Research Institute, Daejeon (KR)

(72) Inventor: So Hyeun Yun, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 61 days.

(21) Appl. No.: 18/477,676

(22) Filed: Sep. 29, 2023

(65) Prior Publication Data

US 2024/0030596 A1 Jan. 25, 2024

Related U.S. Application Data

(62) Division of application No. 17/575,171, filed on Jan. 13, 2022, now abandoned.

(30) Foreign Application Priority Data

Jan. 14, 2021 (KR) ........................ 10-2021-0005350

(51) Int. Cl.
*H01Q 3/26* (2006.01)
*H01Q 3/34* (2006.01)
(Continued)

(52) U.S. Cl.
CPC ............. *H01Q 3/2635* (2013.01); *H01Q 3/34* (2013.01); *H01Q 3/36* (2013.01); *H01Q 3/446* (2013.01);
(Continued)

(58) Field of Classification Search
CPC .......... H01Q 3/2635; H01Q 3/34; H01Q 3/36; H01Q 3/446; H01Q 21/0093; H01Q 21/061; H01Q 21/064; H01Q 25/04
See application file for complete search history.

(56) References Cited

U.S. PATENT DOCUMENTS 4,090,203 A * 5/1978 Duncan ................. H01Q 21/22 343/753
4,697,188 A * 9/1987 Lin .................... H04B 7/18513 342/383

(Continued)

FOREIGN PATENT DOCUMENTS

KR 10-2005-0066904 6/2005
KR 10-1817176 1/2018

OTHER PUBLICATIONS

C. Leclerc et al.; "Design of Multiple Feed per Beam Antenna based on a 3-D Directional Coupler Topology"; 2012 IEEE; 5 pages.

*Primary Examiner* — Dameon E Levi
*Assistant Examiner* — Yonchan J Kim
(74) *Attorney, Agent, or Firm* — KILE PARK REED & HOUTTEMAN PLLC

(57) ABSTRACT

Disclosed is an array antenna comprising a plurality of array elements. The plurality of array elements are formed as a coupler including a central element and peripheral elements configured to surround the central element; each of the central element and the peripheral elements is formed as a waveguide; and the peripheral elements are excited in higher-order modes using coupling slots to form a beam pattern through an electric field distribution of the central element and the peripheral elements.

9 Claims, 8 Drawing Sheets

(51) Int. Cl.

| | |
|---|---|
| ***H01Q 3/36*** | (2006.01) |
| ***H01Q 3/44*** | (2006.01) |
| ***H01Q 21/00*** | (2006.01) |
| ***H01Q 21/06*** | (2006.01) |
| ***H01Q 25/04*** | (2006.01) |

(52) U.S. Cl.

CPC ....... *H01Q 21/0093* (2013.01); *H01Q 21/061* (2013.01); *H01Q 21/064* (2013.01); *H01Q 25/04* (2013.01)

(56) References Cited

U.S. PATENT DOCUMENTS

| | | | | |
|---|---|---|---|---|
| 6,184,828 | B1 * | 2/2001 | Shoki | H01Q 3/26 342/372 |
| 6,992,639 | B1 | 1/2006 | Lier | |
| 7,167,139 | B2 | 1/2007 | Kim et al. | |
| 9,509,478 | B2 | 11/2016 | Montojo et al. | |
| 9,876,284 | B2 | 1/2018 | Romier | |
| 10,601,143 | B2 | 3/2020 | Tomura et al. | |
| 10,840,602 | B2 | 11/2020 | Henry et al. | |
| 10,841,012 | B2 | 11/2020 | Wang et al. | |
| 2013/0099972 | A1 | 4/2013 | Yun et al. | |
| 2013/0271335 | A1 | 10/2013 | Ryu et al. | |
| 2016/0248164 | A1 * | 8/2016 | Fonseca | G01S 13/4409 |
| 2018/0366825 | A1 * | 12/2018 | Klemes | H01Q 21/20 |

* cited by examiner (a) (b)

MULTI-BEAM ANTENNA USING HIGHER-ORDER MODES

CROSS-REFERENCE TO RELATED APPLICATIONS

This is a divisional application of U.S. patent application Ser. No. 17/575,171, filed Jan. 13, 2022 (now pending), the disclosure of which is incorporated herein by reference in its entirety. U.S. patent application Ser. No. 17/575,171 claims priority to and benefits of Korean Patent Application No. 10-2021-0005350 under 35 U.S.C. § 119, filed Jan. 14, 2021, in the Korean Intellectual Property Office, the entire contents of which are incorporated herein by reference.

BACKGROUND

1. Technical Field

Exemplary embodiments of the present disclosure relate to an antenna using higher-order modes, and more particularly, to a structure of a multi-beam antenna using higher-order modes to implement a multi-beam.

2. Related Art

For provision of various and flexible services and high throughput satellites (HTSs), telecommunication broadcasting systems require multi-beam antennas. Such an antenna can increase a frequency and polarization reuse rate so that resources can be efficiently managed. It is advantageous to use array elements for a multi-beam antenna. In single feed per beam (SFPB) antennas using one feeding element to form one beam, a plurality of reflectors should be used to satisfy a narrow beam interval within an allowable spillover loss range. On the other hand, in multi-feed per beam (MFPB) antennas using a plurality of feeding elements to form one beam, the number of reflectors may be significantly reduced using beamforming networks (BFNs).

A BFN for a multi-beam includes signal attenuators and phase shifters. The signal attenuators and the phase shifters of an active BFN include active elements and integrated circuits, and a control unit for controlling the signal attenuators and the phase shifters is included. In antennas including active BFNs, there is an advantage in that a shape of a beam can be precisely controlled, but there are problems in that the complexity of a system configuration may cause increases in volume and cost and many active elements and integrated circuits may cause high heat or power consumption.

In multi-beam antennas including passive BFNs, although a control range of beamforming is reduced as compared with an active BFN, since beams can be formed using only waveguide elements instead of expensive and complex active elements and integrated circuits, a system can be simplified, and a volume and costs can be reduced. Due to the use of waveguides, a problem of heat of the system or a supply of high power can also be resolved. In addition, since there is no need for a control unit, the operation of the system can also be simplified. In terms of performance, the waveguide elements can obtain excellent performance reliability at a lower unit price as compared with active elements and integrated circuits.

SUMMARY

Accordingly, exemplary embodiments of the present disclosure are provided to substantially obviate one or more problems due to limitations and disadvantages of the related art.

Exemplary embodiments of the present disclosure provide a multi-beam array antenna having a simple structure and a small volume using only a coupling element for higher-order mode excitation.

In some exemplary embodiments, an array antenna includes a plurality of array elements, wherein the plurality of array elements consist of a central element and peripheral elements configured to surround the central element, each of the central element and the peripheral elements is a waveguide, and the peripheral elements are excited in higher-order modes through coupling slots to form a beam pattern by electric field distributions of the central element and the peripheral elements.

A signal amplitude may be zero at a center of each of the peripheral elements.

A half of an aperture of each of the peripheral elements close to the central element may have the same phase as an electric field emitted from the central element, and a half of the aperture of each of the peripheral elements farther away from the central element may have an opposite phase to the electric field emitted from the central element.

The plurality of array elements may be placed in a triangular array structure or a hexagonal array structure.

Among the peripheral elements, peripheral elements in the plane perpendicular to the electric field direction of the central element may have the electric field distribution of the TE21 mode rotated by 45°.

Among the peripheral elements, peripheral elements in the plane parallel to the electric field direction of the central element may have the electric field distribution of a combination mode of the TM01 mode and the TE21 mode.

The peripheral elements may be excited in higher-order modes through four coupling slots, and a length of the coupling slots is defined to be less than or equal to a length of a guided wavelength defined by an operating frequency band.

In the array antenna according to the present disclosure, complex and high cost active elements are not used, and a plurality of coupling elements for a dominant mode are not used. In the array antenna according to the present disclosure, by using only a small number of coupling elements (coupling slots) for higher-order mode excitation, it is possible to simplify an antenna structure and reduce a volume thereof. For example, in an antenna according to one embodiment of the present disclosure, four coupling slots for higher-order mode excitation are used instead of a plurality of coupling slots, thereby reducing a length of a coupler to 1/10 of the length and also reducing the number of array elements. Such simplification of a structure minimizes a volume and facilitates manufacturing, thereby providing high productivity and price competitiveness in mass production. Accordingly, an antenna according to the present disclosure can be effectively used as a satellite-mounted antenna and an antenna for mobile transport devices (ships, vehicles, airplanes, rails, and the like). The antenna according to the present disclosure can be used in a phased array antenna for efficient use of frequency resources.

DETAILED DESCRIPTION OF THE EMBODIMENTS

Figure 1:
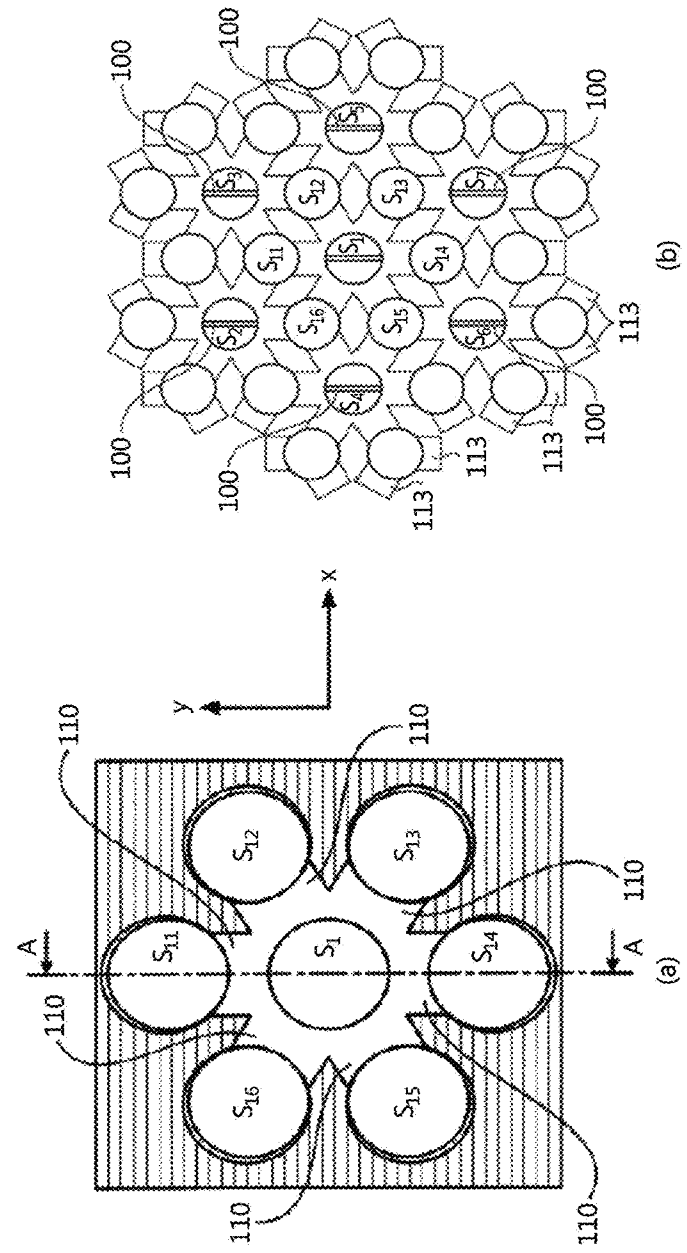
FIG. 1 Prior Art
FIG. 1 shows conceptual diagrams for describing a configuration of a multi-beam antenna according to related art 1.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, 'at least one of A and B' may mean 'at least one of A or B' or 'at least one of combinations of one or more of A and B'. Also, in exemplary embodiments of the present disclosure, 'one or more of A and B' may mean 'one or more of A or B' or 'one or more of combinations of one or more of A and B'.

In exemplary embodiments of the present disclosure, '(re)transmission' may mean 'transmission', 'retransmission', or 'transmission and retransmission', '(re)configuration' may mean 'configuration', 'reconfiguration', or 'configuration and reconfiguration', '(re)connection' may mean 'connection', 'reconnection', or 'connection and reconnection', and '(re-)access' may mean 'access', 're-access', or 'access and re-access'.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings.

FIG. 1 shows conceptual diagrams for describing a configuration of a multi-beam antenna according to related art 1.

FIG. 1 illustrates the configuration of the multi-beam antenna disclosed in related art 1 (U.S. Pat. No. 9,876,284), and in the multi-beam antenna of related art 1, a 1:7 directional coupler and a waveguide phase shifter 100 are used to implement a beamforming network (BFN). As shown in (a) of FIG. 1, the 1:7 directional coupler includes seven waveguides. An input unit excites a dominant mode signal only to a central waveguide 51, and signals of six peripheral waveguides S11, S12, S13, S14, S15, and S16 are excited by coupling slots 110 and 113. An interval between the coupling slots 110 and 113 is about half of a guided wavelength. The number of the coupling slots 110 and 113 corresponds to four to eight times the guided wavelength. The interval and number of the coupling slots 110 and 113 are optimized to satisfy a power distribution in an output of the directional coupler. An output signal amplitude ratio between the central waveguide and the peripheral waveguide is set to 8 dB. The waveguide phase shifter 100 is designed such that all output waveguides have the same phase. (b) of FIG. 1 illustrates an array antenna structure for implementing the multi-beam, and central waveguides 51, S2, S3, S4, S5, S6 and S7 to which signals are propagated have a triangular array structure that is 1.7 times a triangular array structure of FIG. 1.

Figure 2:
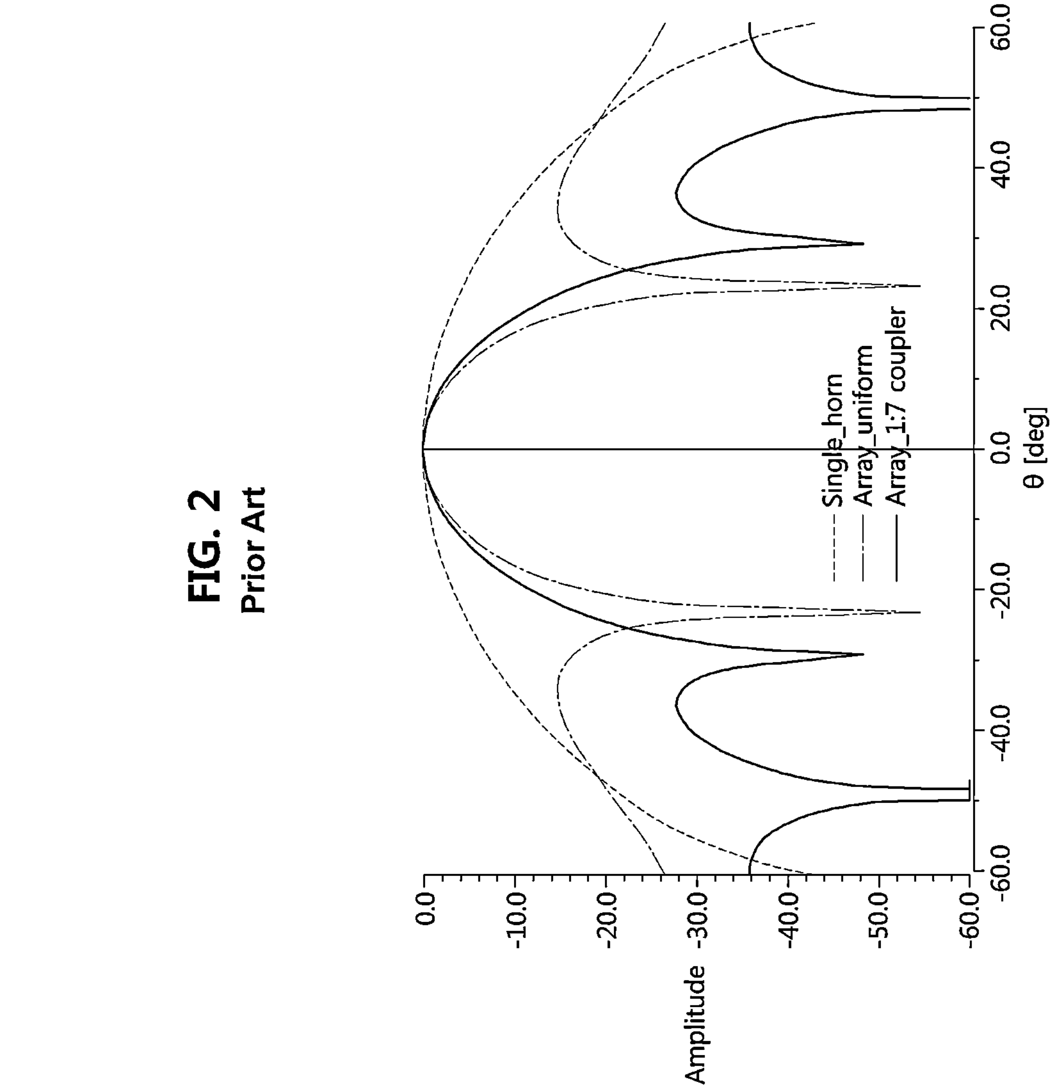
FIG. 2 Prior Art
FIG. 2 is a graph showing a radiation pattern of the multi-beam antenna according to related art 1.

FIG. 2 is a graph showing a radiation pattern of the multi-beam antenna according to related art 1.

Referring to FIG. 2, an output signal amplitude ratio between the central waveguide and the peripheral waveguide is 8 dB, and radiation patterns having the same phase have high directivity in a central direction, a large gain slope, and low side lobe level characteristics. In this case, the high directivity in the central direction can increase a gain of a service area. However, a crossover between beams is low due to a steep gain slope. This means that, in an area that is slightly off a beam center, due to a steep gain slope, it is difficult to maintain a gain of a certain level or more. As described above, in the antenna according to related art 1, a service area, in which a gain of a certain level or more may be maintained, is narrow.

Meanwhile, related art 2 ("Design of multiple feed per beam antenna based on a 3-D directional coupler technology" (Leclerc, C., Aubert, H., Romier, M., Annabi, A., 2012.15 International Symposium on Antenna Technology and Applied Electromagnetics)) discloses a multi-beam antenna using a passive BFN having the same concept as in related art 1 in a 20-GHz band.

Figure 3:
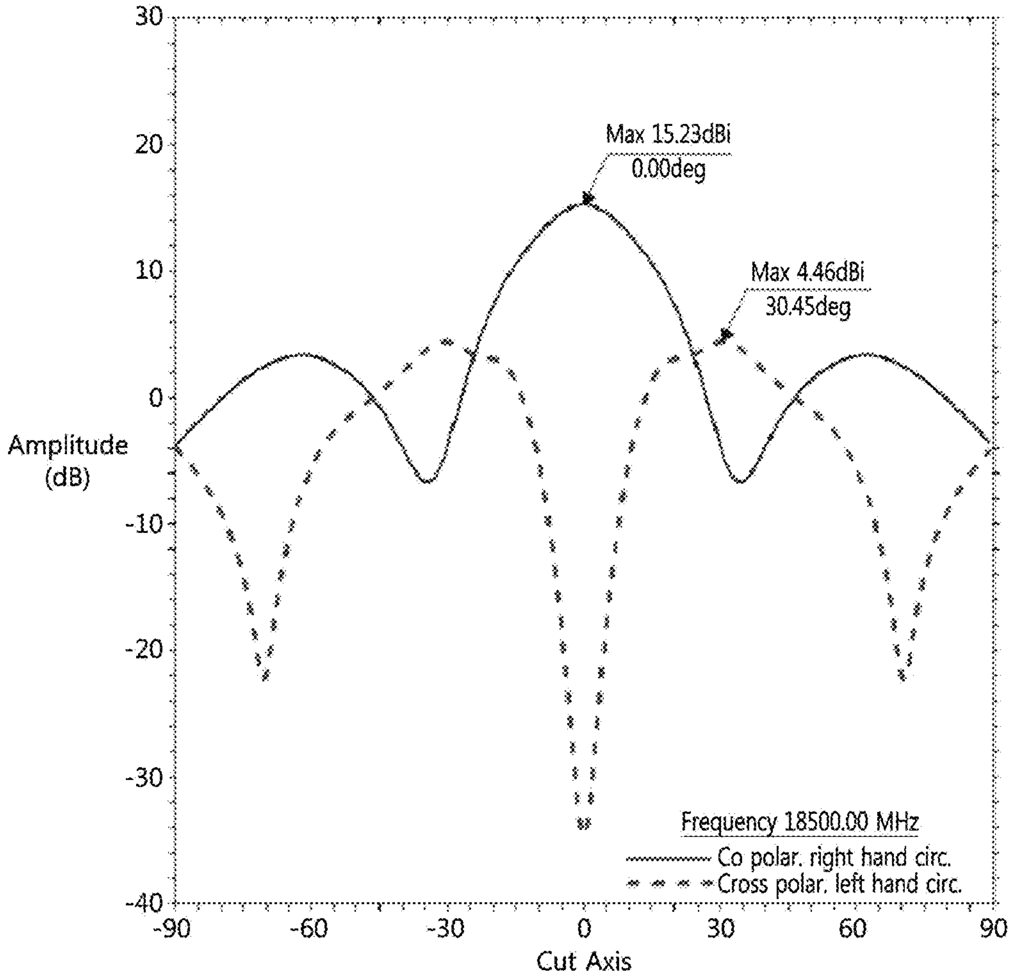
FIG. 3 Prior Art
FIG. 3 is a graph showing a radiation pattern of the multi-beam antenna according to related art 2.

FIG. 3 is a graph showing a radiation pattern of the multi-beam antenna according to related art 2.

FIG. 3 shows directional beam pattern characteristics as in FIG. 2. The length of the passive BFN implemented in related art 2 is about 250 mm which is about 10 times a guided wavelength.

In related art 1 and related art 2, since a passive BFN is used, an antenna structure is simpler than that of an active BFN, but a directional pattern with a steep gain slope causes gain imbalance within a service area due to a low crossover between beams. In order to provide a gain of a certain level or more within a service area, a pattern having flat gain characteristics is advantageous. Accordingly, the present disclosure provides an antenna structure capable of providing a high-quality service not only in service area but also in an outer area thereof by deriving a beam pattern having flat gain characteristics using higher-order modes. In addition, the present disclosure provides an antenna structure having a small volume and low manufacturing costs using a simpler structure than systems implemented in related arts 1 and 2.

In order to transmit energy to a service area without loss, energy should be concentrated within the service area, and an amplitude of a radiation pattern should be zero in other areas. Such a pattern is called a flat gain radiation pattern.

Figure 4:
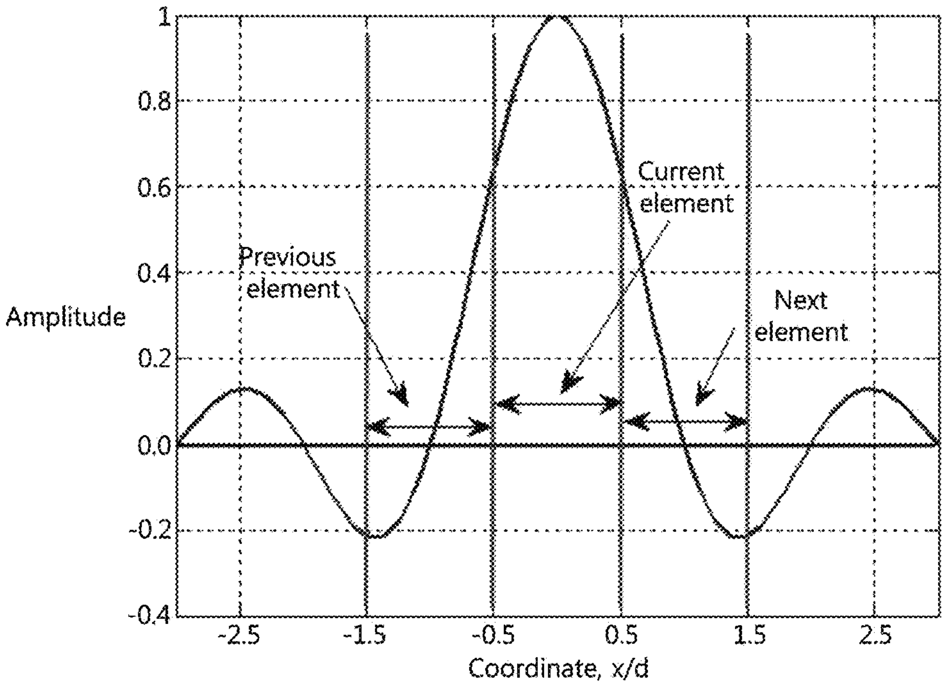
FIG. 4 is a graph showing an ideal flat gain radiation pattern.
Figure 5:
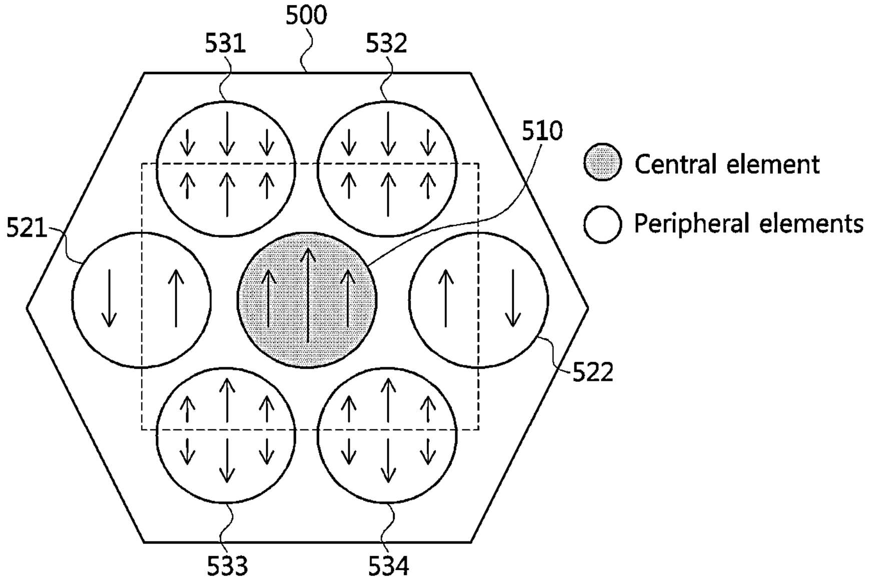
FIG. 5 is a conceptual diagram illustrating the electric field distribution in an antenna array structure so as to obtain an ideal flat gain radiation pattern according to an exemplary embodiment of the present disclosure.

FIG. 4 is a graph showing an ideal flat gain radiation pattern, and FIG. 5 is a conceptual diagram illustrating an electric field distribution in an antenna array structure so as to obtain an ideal flat gain radiation pattern according to an exemplary embodiment of the present disclosure.

A signal amplitude of an ideal flat gain radiation pattern is represented by a sinc function (sin(x)/x) as shown in FIG. 4. That is, in order to obtain the ideal flat gain radiation pattern, a signal should have the greatest amplitude in a central element, and a signal amplitude should disappear at a center of each element of peripheral elements.

When a triangular array structure commonly used in an array antenna or a hexagonal array structure expanding from a triangular array structure has an electric field distribution shown in FIG. 5, an ideal flat gain radiation pattern may be obtained. An array antenna of the present disclosure may include a plurality of array structures, and each of the plurality of array structures may be provided as a coupler having a hexagonal array structure 500 shown in FIG. 5.

Referring to FIG. 5, each array structure 500 may include six peripheral elements surrounding a central element 510. The peripheral elements may be shared by other central elements. Each of the central element 510 and peripheral elements 521, 522, 531, 532, 533, and 534 may include a waveguide, and a beam pattern is formed by the electric field distribution of the central element and the peripheral elements. In an aperture of each of the peripheral elements 521, 522, 531, 532, 533, and 534, half of the aperture close to the central element 510 has the same phase as the central element, and the other half of the aperture farther away from the central element 510 has an opposite phase to the central element 510. Meanwhile, in order to obtain the electric field distribution shown in FIG. 5, a zero point should be generated at a center of the aperture of each peripheral element.

Figure 6:
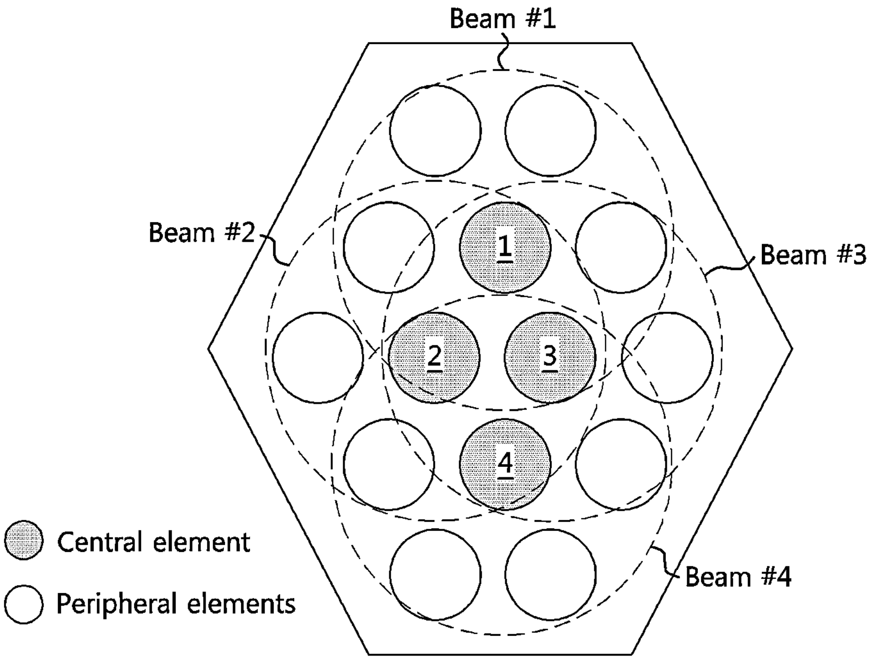
FIG. 6 is a conceptual diagram for an array antenna structure according to an exemplary embodiment of the present disclosure.

FIG. 6 is a conceptual diagram for an array antenna structure according to an exemplary embodiment of the present disclosure. In a related art, a central element is positioned at a distance of 1.7 times an interval between array elements. However, an interval between central elements 1, 2, 3 and 4 according to the present disclosure is the same as an interval between array elements, and the central element 1, 2, 3 or 4 is positioned at a central portion of an array structure. Therefore, an interval between beams can be reduced, thereby increasing a frequency and polarization reuse rate to increase resource utilization.

In addition, the number of required array elements can be reduced. As an example, in order to form four multi-beams, 20 elements are required in the related art, but 14 elements are required in the present disclosure. As the number of multi-beams is increased, a difference in the number of required elements is increased. When 20 multi-beams are required, 91 elements are required in the related art, and 45 elements are required in the present disclosure so that the number of required elements can be reduced by almost half.

Figure 7:
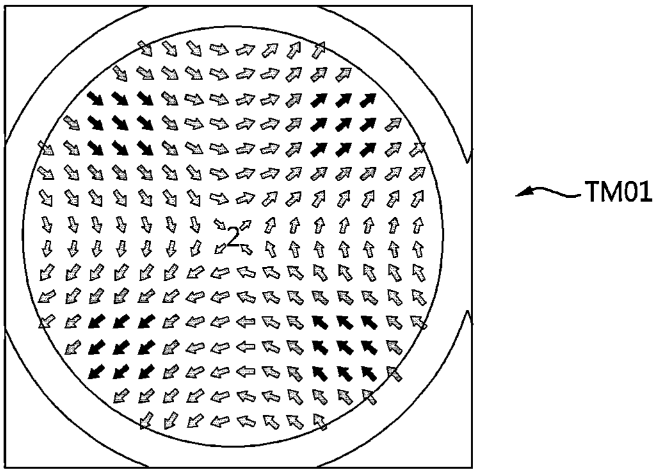
FIG. 7 is a conceptual diagram for describing implementation of the electric field distribution of peripheral elements positioned at lateral sides of a central element in an antenna array structure according to an exemplary embodiment of the present disclosure.
Figure 8:
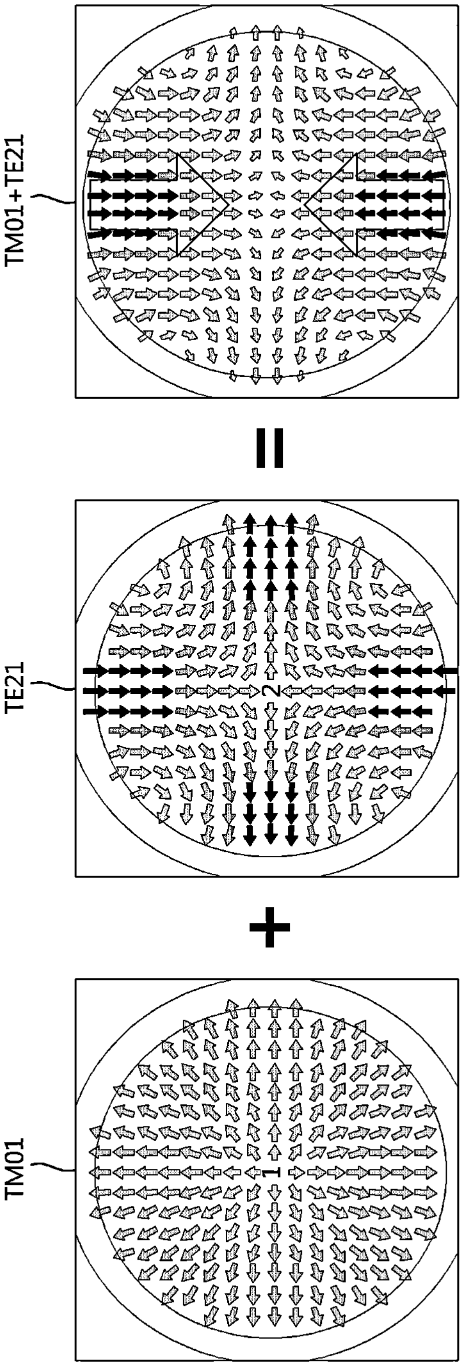
FIG. 8 shows conceptual diagrams for describing implementation of the electric field distribution of peripheral elements positioned above and below a central element in an antenna array structure according to an exemplary embodiment of the present disclosure.

FIG. 7 is a conceptual diagram for describing implementation of an electric field distribution of peripheral elements positioned at lateral sides of a central element in an antenna array structure according to an exemplary embodiment of the present disclosure, and FIG. 8 shows conceptual diagrams for describing implementation of an electric field distribution of peripheral elements positioned above and below a central element in an antenna array structure according to an exemplary embodiment of the present disclosure.

As shown in FIG. 7, in order to obtain an ideal flat gain radiation pattern, an electric field distribution of each of peripheral elements 521 and 522 positioned in a lateral direction of a central element 510 may be implemented in a form rotated by 45° of the TE21 mode in which a zero point occurs at a center of a corresponding aperture. Meanwhile, as shown in FIG. 8, in order to obtain an ideal flat gain radiation pattern, an electric field distribution of peripheral elements 531, 532, 533, and 534 positioned in upper and lower directions of a central element 520 may be implemented in a combination mode of the TM01 mode and the TE21 mode.

In related arts 1 and 2, excitation occurs in a dominant mode through a waveguide coupling slot. However, in the array antenna structure according to the present disclosure, peripheral elements may be excited in higher-order modes through coupling slots.

Figure 9:
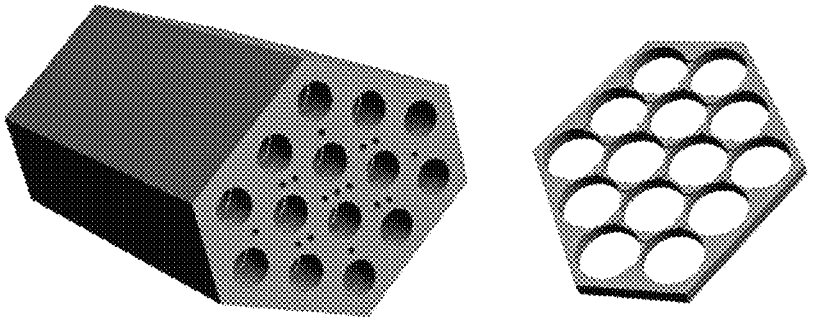
FIG. 9 shows conceptual diagrams for describing an array antenna structure according to an exemplary embodiment of the present disclosure.

FIG. 9 shows conceptual diagrams for describing an array antenna structure according to an exemplary embodiment of the present disclosure.

Referring to (a) of FIG. 9, an example of a BFN structure of an antenna including a coupling slot for forming the multi-beam according to one embodiment of the present disclosure is shown, and referring to (b) of FIG. 9, a part of coupling slots applied to a BFN structure of an antenna according to one embodiment of the disclosure is shown. In an exemplary embodiment of the present disclosure, four higher-order mode coupling slots may be used. A length of a coupler including higher-order mode coupling slots is only a guided wavelength. There is a clear difference from a related art in that a length of a coupler having a dominant mode coupling slot is more than 10 times a guided wavelength.

Figure 10:
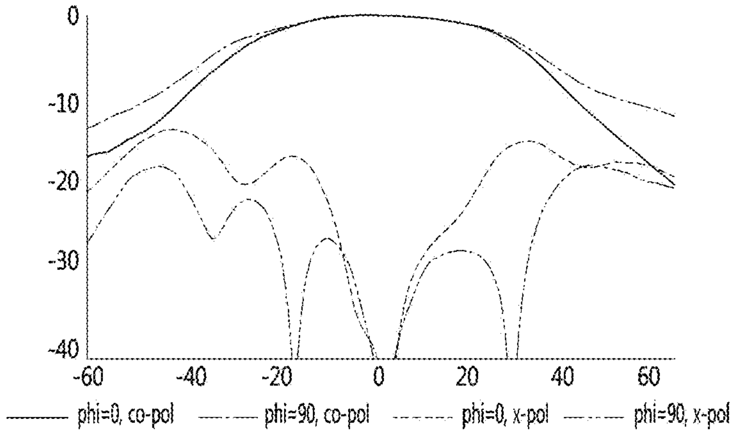
FIG. 10 is a graph showing a radiation pattern of an array antenna according to an exemplary embodiment of the present disclosure.

FIG. 10 is a graph showing a radiation pattern of an array antenna according to an exemplary embodiment of the present disclosure.

A radiation pattern of an antenna according to a related art has a first null point near 30°, but referring to FIG. 10, in the radiation pattern of the array antenna according to one embodiment of the present disclosure, a null point does not occur, and a gain pattern is nearly flat up to an area of 30°. Since a radiation pattern having such flat gain characteristics increases a crossover of an array antenna in which a plurality of elements are disposed, a high gain can be obtained within overall service area rather than a high gain only in a central area of the service area.

In an array antenna according to the present disclosure, complex and high cost active elements are not used, and a plurality of coupling elements for performing a dominant mode are not used. In an array antenna according to the present disclosure, by using only a small number of coupling elements (coupling slots) for higher-order mode excitation, it is possible to simplify an antenna structure and reduce a volume thereof. For example, in an antenna according to one embodiment of the present disclosure, four coupling slots for higher-order mode excitation are used instead of a plurality of coupling slots, thereby reducing a length of a coupler to 1/10 of the length and also reducing the number of array elements. Such simplification of a structure minimizes a volume and facilitates manufacturing, thereby providing high productivity and price competitiveness in mass production. Accordingly, an antenna according to the present disclosure can be effectively used as a satellite-mounted antenna for satellite payloads and an on-the-move antenna for mobile transport devices (ships, vehicles, airplanes, rails, and the like). The antenna according to the present disclosure can be used in a phased array antenna for efficient use of frequency resources.

Although the present disclosure has been described with reference to the embodiments, those skilled in the art will appreciate that the present disclosure can be modified and changed in various forms, without departing from the spirit and scope of the disclosure as disclosed in the accompanying claims.

What is claimed is:

1. An array antenna comprising:

a first array structure including a plurality of first array elements consisting of a first central element and first peripheral elements configured to surround the first central element, each of the first central element and the first peripheral elements being a first waveguide, and the first peripheral elements exciting higher-order modes through first coupling slots to form a beam pattern by electric field distributions of the first central element and the first peripheral elements;

a second array structure including a plurality of second array elements consisting of a second central element and second peripheral elements configured to surround the second central element, each of the second central element and the second peripheral elements being a second waveguide, and the second peripheral elements exciting higher-order modes through second coupling slots to form a beam pattern by electric field distributions of the second central element and the second peripheral elements, wherein:

half of an aperture of each of the first peripheral elements proximal to the first central element has a same phase as an electric field of the first central element; and half of an aperture of each of the first peripheral elements farther away from the first central element has an opposite phase to the electric field of the first central element, wherein:

half of an aperture of each of the second peripheral elements proximal to the second central element has a same phase as an electric field of the second central element; and half of an aperture of each of the second peripheral elements farther away from the second central element has an opposite phase to the electric field of the second central element, and wherein a zero point is generated at a center of each of the apertures of each first and second peripheral elements.

2. The array antenna of claim 1, wherein a signal amplitude is zero at a center of each of the first peripheral elements and the second peripheral elements.

3. The array antenna of claim 1, wherein, among the first peripheral elements, peripheral elements positioned at lateral sides of the first central element has an electric field distribution of a TE21 mode rotated by 45°.

4. The array antenna of claim 1, wherein, among the second peripheral elements, peripheral elements positioned at lateral sides of the second central element has an electric field distribution of a TE21 mode rotated by 45°.

5. The array antenna of claim 1, wherein, among the first peripheral elements, peripheral elements positioned above and below the first central element have an electric field distribution of a combination mode of a TM01 mode and a TE21 mode.

6. The array antenna of claim 1, wherein, among the second peripheral elements, peripheral elements positioned above and below the second central element have an electric field distribution of a combination mode of a TM01 mode and a TE21 mode.

7. The array antenna of claim 1, wherein a length of a coupler including the first coupling slots is defined to be less than or equal to a length of a guided wavelength.

8. The array antenna of claim 1, wherein the first central element is disposed at a central portion of the first array structure and is disposed at a distance of an interval between the plurality of first array elements.

9. The array antenna of claim 1, wherein the second central element is disposed at a central portion of the second array structure and is disposed at a distance of an interval between the plurality of second array elements.

* * * * *